United States Patent [19]
Aufderheide et al.

[11] Patent Number: 4,952,783
[45] Date of Patent: Aug. 28, 1990

[54] LIGHT TRANSMITTING FLEXIBLE FILM ELECTRICAL HEATER PANELS

[75] Inventors: Brian E. Aufderheide, Cedarburg; Michael J. Robrecht, Whitefish Bay; Wayne R. Kelley, Cedar Grove, all of Wis.

[73] Assignee: W. H. Brady Co., Milwaukee, Wis.

[21] Appl. No.: 326,203

[22] Filed: Mar. 20, 1989

[51] Int. Cl.$^5$ ............................................. H05B 3/16
[52] U.S. Cl. .................................. 219/528; 219/543; 219/549
[58] Field of Search ....................... 219/528, 549, 543; 428/215, 216

[56] References Cited
U.S. PATENT DOCUMENTS
4,320,169  3/1982  Yatabe ........................... 428/523

Primary Examiner—Roy N. Envall, Jr.
Attorney, Agent, or Firm—Quarles & Brady

[57] ABSTRACT

Flexible heater panels comprising a light transmitting film substrate and a transparent conductive layer vacuum deposited on the substrate formed of (1) a light transmitting flexible plastic film substrate and (2) a vacuum deposited transparent conductive layer on a surface of the substrate selected from the group consisting of (i) a single lamina of tin oxide or indium tin oxide, (ii) a first lamina of indium oxide on the surface of the substrate and a second lamina of indium tin oxide over the first lamina, or (iii) a first lamina of tin oxide, indium oxide or indium tin oxide on the surface of the substrate, a second lamina of silver, platinum or palladium or alloys thereof over the first lamina, and a third lamina of tin oxide, indium oxide or indium tin oxide over the second lamina.

14 Claims, 5 Drawing Sheets

LIGHT TRANSMITTING FLEXIBLE FILM ELECTRICAL HEATER PANELS

FIELD OF THE INVENTION

This invention relates to heater panels of the type including a flexible plastic film substrate and a conductive thin film layer comprising one or more conductive laminae.

BACKGROUND

The term "thin film" as used herein in the description and the claims means conductive layers or coatings applied by vacuum deposition processes, such as sputtering deposition, that are very thin, for example on the order of about only 100 Angstroms to 5,000 Angstroms, or about 10 to 500 nanometers, thick. A vacuum deposition manufacturing process is capable of producing thin film layers that are very uniform, electrically conductive and which adhere well to plastic film substrates. Thin film conductive layers applied to flexible plastic film substrates can be usefully employed in electronic applications, such as membrane switches, keyboard switchcores and other flexible circuit products in which properties such as light weight, flexibility and surface mount capability are useful features. Electrical elements incorporating conductive thin film layers can be powered by AC and DC power sources, as appropriate to the specific installation under consideration.

A flexible transparent thin film electrical heater panel is a product that is starting to become of interest to manufacturers of various electronic components that require heat at low to moderate temperatures in order to function properly or in which a flexible heater panel is needed that has a special shape or must fit on a flat or curved surface. A heater panel of this general type presently commercially available comprises a gold thin film layer vacuum deposited onto a plastic film substrate. However, a gold thin film flexible heater panel has a number of disadvantageous characteristics that limit its utility. For example, a gold thin film conductive layer does not have a high degree of visible light transmission. This makes it necessary to apply a very thin layer such as only about 100 Angstroms thick on the substrate in order to have even a minimum degree of visible light transmission, which at best is only on the order of about 40% or so. Thus, gold thin film flexible heaters do not have the high degree of light transmission sought for many uses of this type of product. Further, the gold thin film coating imparts a yellowish color or cast to the transmitted light, and it cannot transmit light without changing its color. Also, a gold thin film conductive layer, particularly of the foregoing thickness, is mechanically fragile. This presents a problem because a flexible plastic film heater is often affixed to a surface of an object by means of transparent pressure sensitive adhesive that is coated over the thin film conductive layer. A gold thin film conductive layer, however, is sufficiently fragile that it often cracks and breaks down structurally when subjected to stress of this type of affixation, and thereby rendered useless for its intended application. Another disadvantage that is of great significance for this type of product is that a gold thin film has a very limited power range. The low resistance of gold means that prior art heaters of this type have a very low power density range, so that the maximum power density of gold thin film is only about one to two watts per square inch. Other adverse factors include questionable environmental durability and relatively high expense due to the cost of gold.

SUMMARY OF THE INVENTION

We have now developed new light transmitting flexible heater panels including a light transmitting flexible plastic film substrate and a transparent conductive thin film layer from the group consisting of (1) a single lamina of tin oxide or indium tin oxide on a surface of the film substrate, (2) a first lamina of indium oxide on a surface of the film substrate and a second lamina of indium tin oxide over the first lamina, or (3) a first lamina of tin oxide, indium oxide or indium tin oxide on a surface of the film substrate, a second lamina of silver, platinum or palladium, or an alloy of two or more thereof over the first lamina, and a third lamina of tin oxide, indium oxide or indium tin oxide over the second lamina. A pair of spaced conductive bus electrodes extend over the conductive thin film layer along opposed edge portions thereof for connection to an AC or DC power source. The conductive film layer may be covered with light transmitting adhesive so that the heater panels can be adhered to a surface of an object.

Flexible thin film heater panels of our invention have significant advantages compared to prior art constructions such as the gold thin film heater described above. These are explained in detail in the description that follows, but may be summarized as including higher visible light transmission, transmission of incident light without discoloration of the light, higher power density capabilities, superior environmental durability and a high degree of structural or mechanical integrity.

DESCRIPTION OF THE DRAWINGS

The construction, operation and advantages of the new flexible heater panels of the present invention are set forth in the detailed description by reference to the following drawings, in which.

DESCRIPTION OF PRESENTLY-PREFERRED EMBODIMENTS

Figure 1:
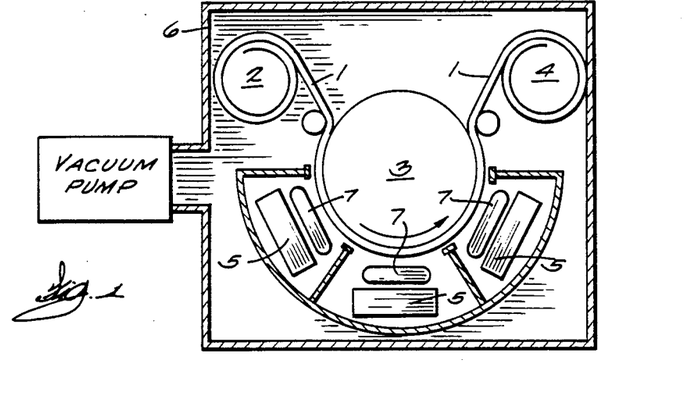
FIG. 1 is a schematic view of apparatus for sputter vacuum deposition of transparent conductive layers, illustrating one process suitable for manufacture of the heater panels of this invention.

(a) Background; FIG. 1

FIG. 1 schematically illustrates a currently preferred technique for the deposition of thin film transparent conductive layers onto flexible plastic film substrates as a step in the manufacture of the flexible heater panels of the invention. The technique represented by the apparatus of FIG. 1 is the wellknown sputtering vacuum deposition method, often referred to in the art simply as sputtering.

Briefly, sputtering is a deposition process in which a negative DC or RF voltage supply is applied to a sputtering metal target that is contained within a vacuum chamber. A partial vacuum such as in the range of a few millitorr to about 100 mTorr is drawn in the vacuum chamber in the presence of an inert gas such as argon or a reactive gas mixture such as argon and oxygen, and a gas plasma or glow discharge is created between the target and the substrate film to be coated. Positively charged gas ions generated in the plasma region are attracted to the negative potential at the target and propelled towards it at a very high velocity. Collisions between the positively charged gas ions and the target result in a momentum transfer to the target surface atoms and the ejection of mainly neutral atomic sized particles out of the target. These particles traverse the space between the target and the substrate film and are deposited or condensed as a thin lamina or coating on the substrate. If a metallic oxide thin film is to be formed on the substrate, a reactive sputtering process is used in which a compound is synthesized by sputtering the metal target with a reactive gas such as oxygen or an argon and oxygen mixture to form a compound of the metal and the reactive gas; thus, tin oxide can be sputter deposited using a tin metal target and an argon and oxygen gas mixture and indium tin oxide can be sputter deposited using an indium tin metal alloy target and an argon and oxygen gas mixture. Additional information about sputter coating is widely available, such as in Thin Film Processes, Vossen & Kern, published by Academic Press, Inc., 1978, and in U.S. Pat. No. 4,740,385.

Sputtering vacuum deposition produces a thin, high quality flexible conductive thin film layer or lamina having a uniform thickness in the transverse and longitudinal directions. Although other processes, such as evaporation, can be used to deposit the conductive layers of a flexible heater panel of the invention, sputtered layers are preferred since they are extremely dense, have good electrical properties, and adhere well to the underlying substrate films.

The preferred sputter coating process for depositing the thin film transparent conductive lamina is schematically illustrated in FIG. 1. This is a known process which is practiced with sputter roll coating equipment which is commercially available from Leybold A.G., Cologne, Fed. Rep. of Germany, under the designation Type A-550-B-5-Z3R. Briefly, the process illustrated is a continuous thin film web coating process. A web 1 of plastic film substrate is withdrawn from a supply roll 2, passes around a chill roll 3 and is then wound onto a take-up roll 4. Three target stations 5 are positioned around the chill roll 3. The rolls 2, 3 and 4 and target stations 5 are all held within a vacuum chamber 6 in which a partial vacuum is drawn in the presence of the selected gas. The plasma region for each target is depicted by zones 7 in FIG. 1. The target stations 5 each provide one coating of the target material on the substrate, for a total of three coatings per layer, to provide a uniformly dense lamina in the final product.

In addition to the web sputtering deposition process described above, flexible heater panels of the invention can be made in which the plastic film substrate is supplied to the vacuum chamber in the form of separate sheets of film. Either process can be used to produce a plurality of thin film conductive layers on a sheet or web of substrate that are later diecut to form individual heater panels, so as to achieve production economies.

Figure 2:
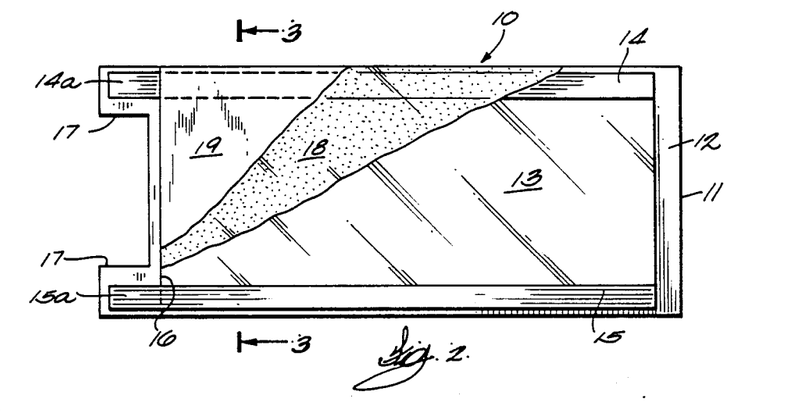
FIG. 2 is a plan view, with portions broken away, of a first embodiment of a flexible heater panel of the invention.
Figure 3:
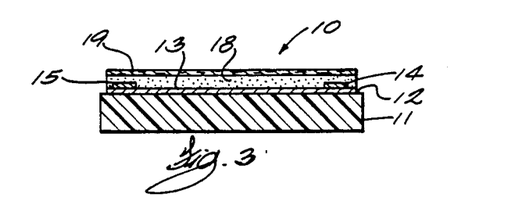
FIG. 3 is a transverse sectional view of the heater panel of FIG. 2.

(b) First Embodiment; FIGS. 2 and 3

A flexible heater panel 10 is illustrated in FIGS. 2 and 3 as a first embodiment of our invention.

Referring first to FIG. 2, in which several layers are broken away to better illustrate the various elements of the construction, flexible heater panel 10 comprises a light transmitting flexible plastic film substrate 11 having a first surface 12 on which a transparent conductive layer 13 consisting of a single lamina has been sputter vacuum deposited in the shape of a rectangular conductive zone. The term "light transmitting" as used herein and in the claims with reference to the plastic film substrate is defined to mean that the substrate is to be either transparent or translucent. A conductive bus bar electrode 14 extends along one of the long edges of layer 13, electrode 14 being on top of the layer 13 as best seen in FIG. 3. A second conductive bus bar electrode 15 extends along an opposite long edge of conductive layer 13, also on top of the layer, so as to be spaced from electrode 14. Electrodes 14 and 15 each extend beyond an end 16 of conductive layer 13 onto a short tail 17 formed as two cut-out portions of substrate 11; the end sections 14a and 15a of the electrodes on tails 17 are exposed for connection to an AC or DC power source.

A layer 18 of light transmitting nonconductive pressure sensitive adhesive extends over and completely covers thin film conductive layer 13, which will be used to adhere panel 10 to an object as described further below. The term "light transmitting" as used herein and in the claims with reference to an adhesive such as layer 18 is defined to mean that the adhesive layer is to be either transparent or translucent. A release liner 19 covers the layer 18 of adhesive to protect it until a panel is ready to be adhered to an object, at which time the liner is stripped away to expose the nonconductive adhesive.

Heater panel 10 is shown in cross section in FIG. 3 with the thickness of the various layers greatly exaggerated for clarity of description. Thin film transparent conductive layer 13 is deposited onto and adheres to surface 12 of the flexible film substrate 11. Spaced bus bar electrodes 14 and 15 are on top of layer 13 so as to be in electrical contact therewith, and layer 18 of adhesive covers layer 13 and the portions of electrodes 14 and 15 along the layer; release liner 19 covers the adhesive layer 18 to protect it until the panel is ready to be joined to an object. Conductive layer 13 is illustrated in FIGS. 2 and 3 as covering a portion of surface 12 of substrate 11, but heater panel 10 also can be made with conductive layer 13 covering the entire surface 12 of the substrate.

In this first embodiment, heater panel 10 has a transparent thin film conductive layer 13 that consists of a single lamina of tin oxide or indium tin oxide (ITO). We have found that use of either of these two materials as the single lamina of panel 10 provides a heater capable of meeting the objectives of the invention as explained in greater detail below. The tin oxide or ITO is to be applied by vacuum deposition, preferably by sputtering vacuum deposition, at a thickness in the range of about 200 Angstroms to 5,000 Angstroms (20 to 500 nanometers), preferably at a thickness in the range of about 400 to 2,500 Angstroms (40 to 250 nanometers).

Figure 4:
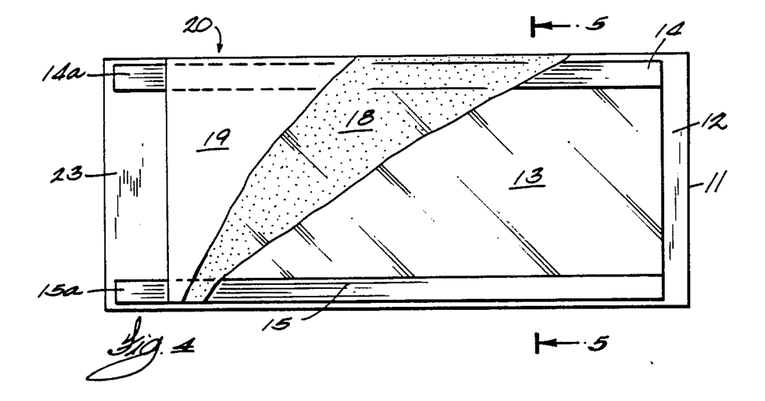
FIG. 4 is a plan view of a second embodiment of a heater panel of the invention.
Figure 5:
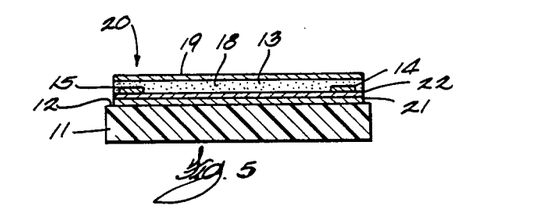
FIG. 5 is a transverse sectional view of the heater panel of FIG. 4.

(c) Second Embodiment; FIGS. 4 and 5

Heater panel 20 is shown in FIGS. 4 and 5 as a second panel according to our invention. Elements in these two drawings that are the same as or similar as elements illustrated in FIGS. 2 and 3 are identified by the same reference numeral.

Heater panel 20 comprises substrate 11, thin film transparent conductive layer 13, first and second electrodes 14 and 15, layer 18 of light transmitting adhesive and liner 19 arranged as described in connection with heater panel 10.

Referring first to the plan view of FIG. 4, connecting sections 14a and 15a of electrodes 14 and 15, respectively, are exposed on a section 23 of substrate 11 not covered by transparent conductive layer 13. However, in comparison to heater panel 10, it will be noted that there is no cutout portion of the substrate between the connecting sections 14a and 15a of the two electrodes. This type of structure is useful in which additional mechanical or physical support for the connecting sections of the electrodes may be needed in a specific installation. Also, section 23 of substrate 11 between connecting sections 14a and 15a of the electrodes serves to dissipate heat developed during operation of the heater panel. Heater panel 10 of the first embodiment also may include this structure.

The sectional view of FIG. 5 illustrates another feature of heater panel 10. The transparent conductive layer 13 consists of two laminae of vacuum deposited thin film conductive material. First lamina 21 is deposited on surface 12 of substrate 11 and second lamina 22 is deposited on top of the first lamina. When a double laminae transparent conductive layer 13 is formed in this fashion, the first lamina 21 is to consist of indium oxide and second lamina 22 is to consist of indium tin oxide. The total thickness of layer 13 including the two laminae can be in the range of about 200 Angstroms to 5,000 Angstroms (20–500 nanometers), preferably in the range of about 400–2,500 Angstroms (40–250 nanometers).

Figure 6:
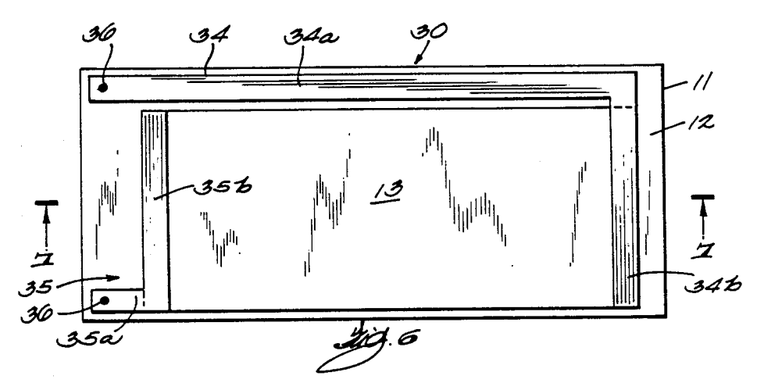
FIG. 6 is a plan view of a third embodiment of a heater panel of the invention.
Figure 7:
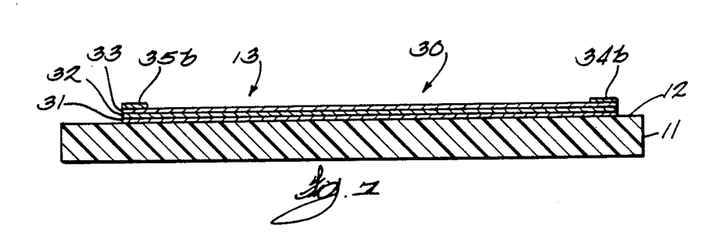
FIG. 7 is a longitudinal sectional view of the heater panel of FIG. 6.

(d) Third Embodiment; FIGS. 6 and 7

Flexible heater panel 30 is illustrated in plan view in FIG. 6 and in longitudinal section view in FIG. 7 as a third embodiment of a heater panel of the invention. Again, elements that are the same as or similar to corresponding elements of heater panel 10 are identified with the same reference numeral used in FIGS. 1 and 2.

Heater panel 30 includes transparent conductive layer 13 deposited on surface 12 of light transmitting flexible film substrate 11. First bus bar electrode 34 is an L-shaped electrode including a first branch 34a that extends along surface 12 of substrate 11 slightly spaced from layer 13 and a second branch 34b that extends on top of and along an end or short edge portion of conductive layer 13. Second bus bar electrode 35 is also an L-shaped electrode including a first branch 35a extending along surface 12 of substrate 11 and a second branch 35b extending on top of and along an end or short edge portion of conductive layer 13 opposite from the end thereof underneath branch 34b of first electrode 34. L-shaped electrodes of this configuration, each having a portion in electrical contact with conductive layer 13 along a short side thereof when the layer is rectangular in shape, can have an advantage in some installations in that they will provide for more even current distribution across the conductive layer, and thereby result in more even heating of layer 13. Panels 10 and 20 described above also may incorporate an electrode configuration as illustrated in FIGS. 6 and 7. Connections to electrodes 34 and 35 are made at the ends thereof on surface 12 of substrate 11 as indicated by connecting points 36 in FIG. 6.

Referring now to FIG. 7, transparent thin film conductive layer 13 is a triple-laminae structure including first lamina 31 on surface 12 of substrate 11, second lamina 32 on top of first lamina 31, and third lamina 33 on top of second lamina 32. Electrodes 34 and 35 are applied on top of third lamina 33 in electrical contact therewith. In accordance with this invention, first lamina 31 is to consist of vacuum deposited tin oxide, indium oxide or indium tin oxide; second lamina 32 is to consist of vacuum deposited silver, platinum or palladium or an alloy of two or more of said metals; and third lamina 33 is to consist of vacuum deposited tin oxide, indium oxide or indium tin oxide. The total thickness of layer 13, including the three laminae, is to be in the range of about 400 Angstroms to 5,000 Angstroms, i.e. about 40 to 500 nanometers. Second lamina 32 of silver is to be thinner than the other lamina, preferably in the range of about 20 Angstroms to 400 Angstroms, or about 2 to 40 nanometers, since a thicker metal second lamina will impair light transmission of the heater panel. Silver, platinum and palladium, and alloys of two or more of said metals, are neutral in color when applied by vacuum deposition and do not color light transmitted through conductive layer 13. A useful construction for the triple-laminae layer 13 will comprise first and third laminae about 450 Angstroms thick and a second lamina about 20 to 400 Angstroms thick.

It will further be noted that heater panel 30 of FIGS. 6 and 7 does not include a layer 18 of adhesive covered by liner 19 as illustrated with first and second embodiments 10 and 20. Heater panel 30 is designed to be physically sandwiched between other components of apparatus on which it is installed in order to be held in place. For example, heater panel 30 can be sandwiched between a liquid crystal display and an electroluminescent panel that is to illuminate the LCD display. It should be noted that the adhesive layer 18 and liner 19 also can be omitted from heater panels 10 and 20 when the adhesive is not necessary for holding the panel at the desired position.

Figure 8:
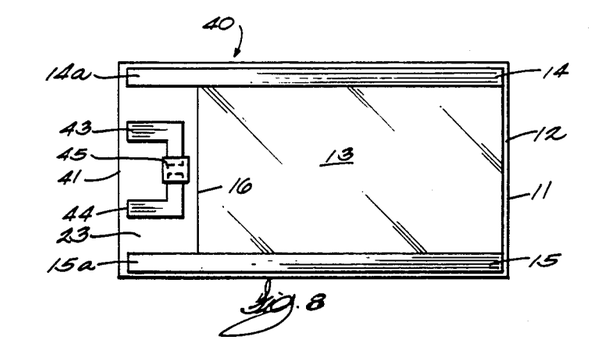
FIG. 8 is a plan view of a fourth embodiment of a heater panel of the invention.

(e) Fourth Embodiment; FIG. 8

Heater panel 40 is illustrated in FIG. 8 as a fourth embodiment of a panel of the present invention. Panel 40 is of construction similar to panel 20 of FIGS. 4 and 5 and includes a rectangular substrate 11, rectangular thin film conductive layer 13 on surface 12 of the substrate, and bus bar electrodes 14 and 15. Panel 40 is illustrated without adhesive layer 18, which, as noted above, is an optional element of a panel of the invention. Conductive layer 13 has an end 16 that is spaced from end 41 of substrate 11, so that there is a section 23 of surface 12 of the substrate between exposed connector portions 14a and 15a of the electrodes 14 and 15. Conductive traces 43 and 44 are applied along section 23, such as by printing with conductive ink; the traces are each illustrated as L-shaped, although other configurations can be used. A surface mounted chip thermistor 45 is connected between traces 43 and 44, such as with conductive epoxy. Wire connections, not shown, are made to portions of traces 43 and 44 adjacent end 41 of the substrate. Thermistor 45 is shown as being mounted on surface 12 of substrate 11, but it also can be mounted on the opposite surface of the substrate if a specific installation requires that surface 12 should remain flat, in which event traces 43 and 44 can be on surface 12 with appropriate electrical feed through connections to the opposite surface or traces 43 and 44 can be formed on the surface of the substrate opposite from surface 12. The thermistor 45 measures the temperature of the substrate 11 when the heater panel 40 is in operation; output from thermistor 45 can be transmitted to suitable control electronics so as to provide continuous measurement and control of the temperature to which the heater panel is heated. The combination of the thermistor and the heater panel thus provides the end user with a flexible transparent heater and temperature detector as a combined unit, which can simplify the end user's design and provide for accurate control and measurement of the temperature developed by the heater panel. The thermistor and its conductive traces are located outside a boundary of transparent conductive layer 13 so as to be on a section of the substrate through which transparency is not required.

(f) Alternate Configurations; FIGS. 9-14

Heater panels 10, 20, 30 and 40 of the invention can be provided in other configurations, several of which are illustrated in FIGS. 9-14.

Figure 9:
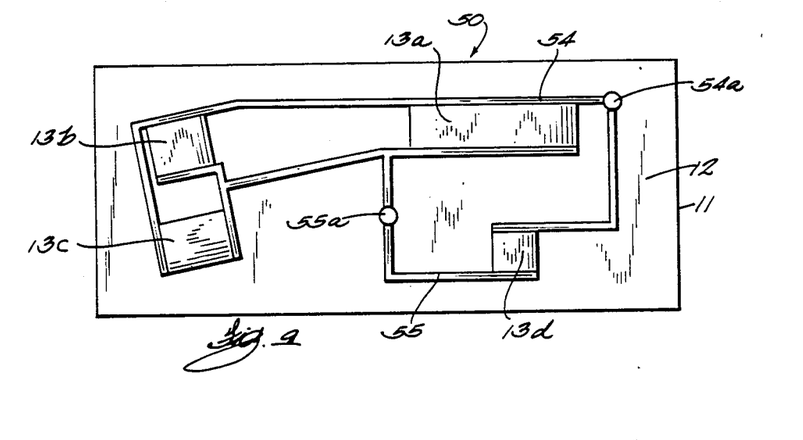
FIG. 9 is a plan view of a heater panel incorporating multiple thin heating elements of the invention.

FIG. 9 illustrates a heater panel 50 including four transparent conductive layers 13a, 13b, 13c and 13d deposited at various locations along surface 12 of substrate 11. A first electrode 54 has a branch extending from conductive pad 54a along a long edge of rectangular conductive layer 13a and then across the substrate and across an edge of the square conductive layer 13b and then across the substrate and along an edge of the third conductive layer 13c; a second branch of electrode 54 extends from conductive pad 54a across surface 12 of the substrate and then across an edge of fourth conductive layer 13d. Second bus bar electrode 55 has two branches extending from a conductive pad 55a, across the substrate and then across an edge of layers 13a, 13b, 13c and 13d opposite from electrode 54. Power connections to the panel 50 are made at conductive pads 54a and 55a. Heater panel 50 illustrates the versatility of panels of the invention in that a panel can be provided having several spaced separate heating elements and can be used with an apparatus that requires heat at several different locations; also, the heating elements such as 13a–13d can each be of a different size or different configuration.

Figure 10:
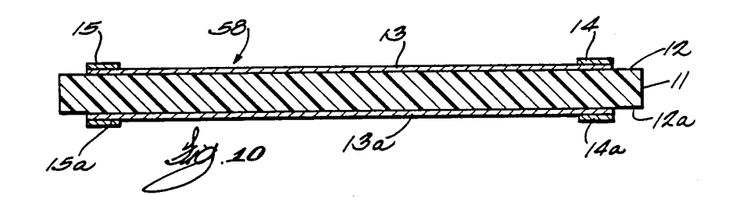
FIG. 10 is a longitudinal sectional view similar to FIG. 7 illustrating an alternate configuration of a heater panel of the invention.

FIG. 10 illustrates heater panel 58 that includes a first transparent conductive layer 13 on surface 12 of substrate 11 and a second transparent conductive layer 13a on the opposite surface 12a of substrate 11. Electrodes 14 and 15 are in electrical contact with layer 13 and electrodes 14a and 15a are in electrical contact with layer 13a. Conductive layers 13 and 13a can be wired in parallel, in series or independently of one another, with appropriate electrical feed through connections between the electrodes as required. Heater panel 60 has heater elements on opposed surfaces of substrate 11 to provide a heater panel with double the power output of a heater panel with a heater element on only one surface that can be useful in certain specialized installations.

Figure 11:
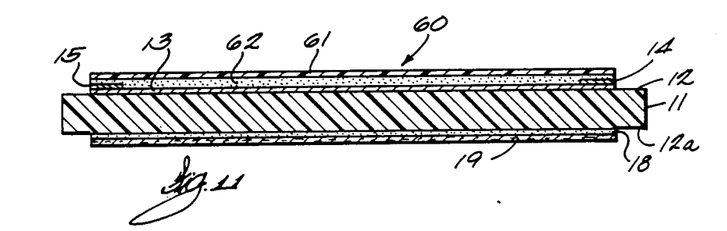
FIG. 11 is a transverse sectional view similar to FIG. 3 illustrating a second alternate configuration of a heater panel of the invention.

In FIG. 11, a heater panel 60 is provided including transparent conductive layer 13 on first surface 12 of substrate 11 with bus bar electrodes 14 and 15 in contact therewith. A light transmitting plastic film layer 61 is laminated over conductive layer 13 by means of light transmitting adhesive layer 62. The term "light transmitting" as used herein and in the claims with reference to film layer 61 is defined to mean that the layer is to be either transparent or translucent film. A layer 18 of light transmitting adhesive is along opposite surface 12a of substrate 11 and is covered by a release liner 19. Layer 18 of adhesive is used to apply heater panel 60 to a surface of an object upon removal of liner 19. Film layer 61 provides a top film that seals and protects conductive layer 13 and the construction of panel 60 includes two plastic film layers, substrate 11 and film layer 61, to withstand the forces that may be imposed on the heater panel by dimensional changes of the object to which the panel is attached. Panel 60 is thus adapted for installations in which relatively high stress of this type may be encountered.

Figure 12:
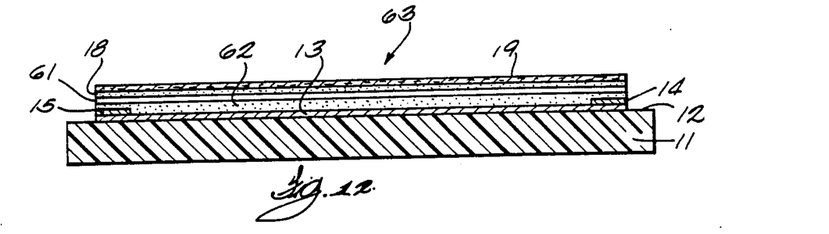
FIG. 12 is a transverse sectional view similar to FIG. 3 illustrating a third alternate configuration of a heater panel of the invention.
Figure 13:
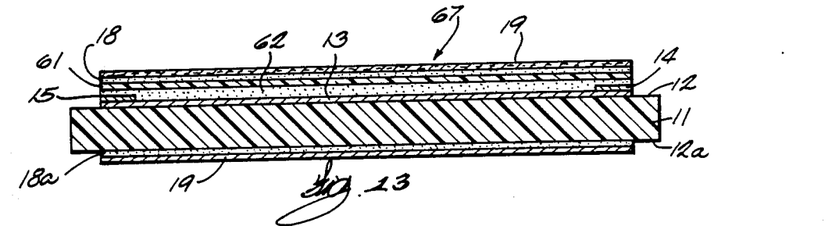
FIG. 13 is a transverse sectional view similar to FIG. 3 illustrating a fourth alternate configuration of a heater panel of the invention.
Figure 14:
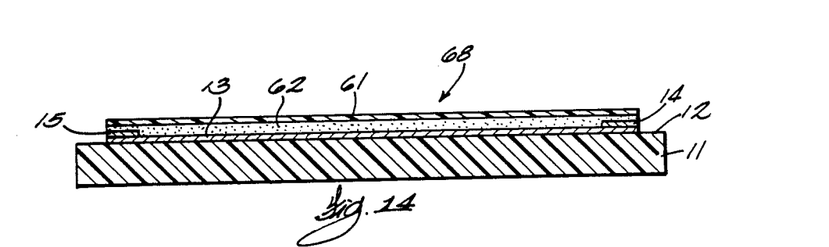
FIG. 14 is a transverse sectional view similar to FIG. 3 illustrating a fifth alternate configuration of a heater panel of the invention.

A heater panel with a light transmitting plastic film layer 61 adhesively laminated over a transparent thin film conductive layer such as illustrated in connection with heater panel 60 of FIG. 11 can be made in other configurations. FIG. 12 illustrates heater panel 63 in which a layer 18 of light transmitting adhesive is applied over the exposed or top surface of light transmitting plastic film layer 61; when layer 18 of adhesive is pressure sensitive adhesive, it can be covered with a release liner 19 as shown in the drawing. Layer 18 of adhesive will be used to affix heater panel 63 to the surface of an object to be heated, after removal of liner 19 when used. FIG. 13 illustrates heater panel 67 that includes layer 18 of light transmitting adhesive over the light transmitting plastic film layer 61 and layer 18a of light transmitting adhesive along opposite surface 12a of substrate 11; layers 18 and 18a of adhesive are each covered by a release liner 19 when the adhesive is a pressure sensitive adhesive. Heater panel 67 thus has adhesive layers on two sides that can be used to affix the panel along both its front surface and its rear surface so that the heater panel 67 can be adhesively sandwiched between two elements. FIG. 14 shows a heater panel 68 including film layer 61 overlaminated over conductive layer 13 by means of adhesive layer 62 but which does not include any adhesive layer for affixing the panel to the surface of an object; panel 68 can be held in place by being sandwiched or clamped between two elements of the apparatus with which it is combined.

Transparent conductive layer 13 of the panels 50, 60, 63, 67 and 68 can be made with either a single lamina as in heater panel 10 or the double or triple laminae of panels 20 and 30, respectively, and can be made with the electrode construction of any of the first three embodiments.

(f) Materials of Construction

The substrate 11 of the heater panels described above is to consist of a flexible plastic film, of which many types of commercially available films are suitable. Useful films include polyester films such as polyethylene terephthalate, polyolefin films such as polyethylene and polypropylene, vinyl films, fluorocarbon films, etc. The softening temperature of the substrate film limits the maximum operating temperature of a heater panel of the invention, so that a particular film should be chosen with regard to the operating temperature required for a particular end use. Polyethylene terephthalate polyester film is useful for most applications of flexible transparent heater panels and enables an operating temperature of about 200° F. for continuous operation and 250° F. for short term intermittent operation. The thickness of the substrate film can vary widely, such as in the range of 0.001 to 0.030 inches thick, or thicker if so desired; films in the range of 0.005 to 0.010 inch thick are appropriate for most installations. The substrate film also should be light transmitting, by which is meant it is optically transparent to visible light or translucent so as to transmit but diffuse visible light.

Adhesive layer 18, 18a or 61 in the embodiments described above is to comprise a layer of light transmitting adhesive. Transparent pressure sensitive adhesives are particularly preferred for most end uses and comprise a polymer or copolymer which may be compounded with one or more compatible resin tackifiers and dispersed in an organic solvent or water. A particularly useful adhesive consists of a transparent pressure adhesive including an acrylic copolymer. Additional types of adhesives can be used for these layers, such as UV curable acrylic copolymer adhesives, heat activated polyester adhesives or thermoset flexibilized epoxy adhesives. Adhesive layers employed in the construction of the heater panels of the invention should be nonconductive.

A release liner such as liner 19 that is employed to protect pressure sensitive adhesive until a heater panel is to be applied to an object can be a paper or plastic film coated or impregnated with generally known release materials; silicone, carbamate, and various other types of release coatings or impregnants are well known in the art.

The bus bar electrodes 14 and 15 ar most usefully applied onto the heater panels by means of printing, such as by screen printing, after the transparent conductive layers have been vacuum deposited on the substrate film. Printable conductive inks are thus most suitable for the electrodes. A useful conductive ink comprises silver particles in an epoxy binder, such as the ink available commercially under the tradename Amicon CT-5030. When a conductive printable ink is used for the electrodes, it should have good adhesion to the metallic oxide transparent conductive layer 13 of the heater panel. Further, the resistance of the ink electrodes should be substantially less than the resistance of the thin film transparent conductive layer so as to provide for even distribution of the current along a layer 13; a preferred, but not limiting, ratio is to use ink for the electrodes that has a sheet resistance that is about 1/100 the sheet resistance of the transparent conductive layer 13.

(g) Industrial Applicability; FIGS. 15–20

Figure 15:
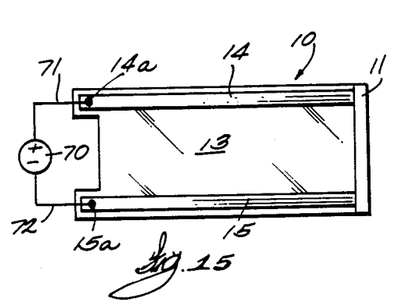
FIG. 15 is a schematic plan view illustrating a heater panel connected to a DC power source.
Figure 16:
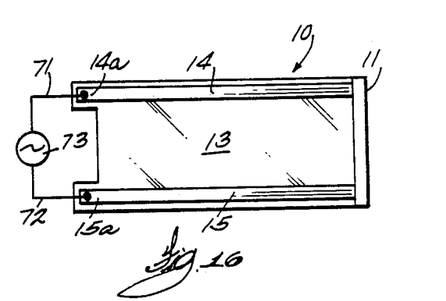
FIG. 16 is a schematic plan view illustrating a heater panel connected to an AC power source.

The electrical flexible heater panels of the invention can be designed to operate with a power supply having an output at any point in the range of 5 volts to 240 volts AC or DC. FIG. 15 shows heater panel 10 connected to a DC power source 70. An insulated wire 71 is connected between one side of power source 70 and bus bar electrode 14 and a similar wire 72 is connected from the other side of the power source to bus bar electrode 15 of panel 10. The connection between the wires 71, 72 and the electrodes 14, 15 is made along the exposed portions or connecting sections 14a, 15a of the electrodes located on tails 17 of the panel. FIG. 16 illustrates heater panel 10 connected to AC power source 73 in similar fashion.

Figure 17:
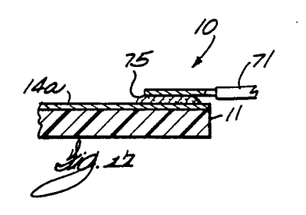
FIG. 17 is a side view, with portions broken away, illustrating a first manner of connecting wires to a heater panel.
Figure 18:
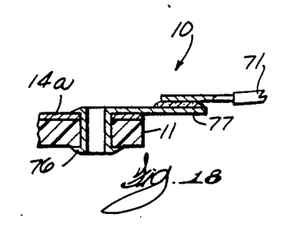
FIG. 18 is a side view, with portions broken away, illustrating another manner of connecting wires to a heater panel.

Wires can be connected to the heater panels of the invention by any suitable means. FIG. 17 illustrates an exemplary system in which the bared end of insulated wire 71 is attached to connecting portion 14a of an electrode 14 by means of a pad 75 of conductive epoxy. FIG. 18 shows another useful construction in which a metal eyelet 76 is crimped onto connecting portion 14a of the electrode, the eyelet extending through substrate 11 of the heater panel. A metal tab 77 extends from the upper end of the eyelet, and wire 71 is soldered onto tab 77. Tab 77 also can be constructed so as to be crimped onto wire 71.

Figure 19:
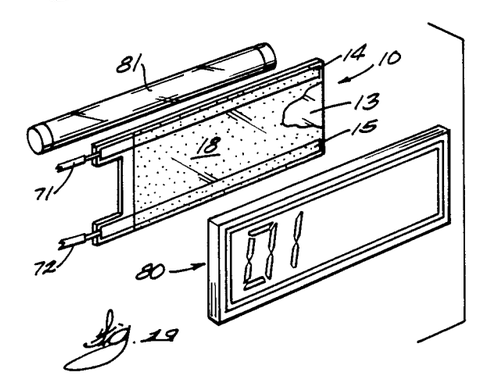
FIG. 19 is a perspective view illustrating an exemplary installation of a heater panel of the invention.
Figure 20:
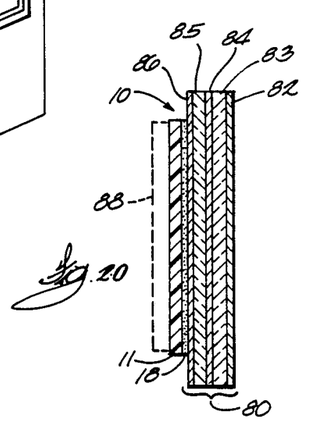
FIG. 20 is a vertical sectional view of the installation of FIG. 19.

An exemplary installation of a heater panel of the invention is illustrated in FIGS. 19 and 20. A liquid crystal display (LCD) will often react at an unacceptably slow rate when subject to temperatures such as on the order of 32° F. and below; an LCD unit can even stop displaying alphanumeric characters entirely if the temperature gets low enough. A heater panel of the invention can be attached to an LCD display and controlled to heat the display when the temperature drops to a preselected level. The combination is shown in exploded view in FIG. 19. Heater panel 10 is located behind LCD display 80, and a light 81, shown as a fluorescent bulb although other light sources can be used, is located behind the heater panel; a reflector, not shown, may be positioned behind the light 81. Wires 71 and 72 are connected to heater panel 10 and to a suitable power source. Because substrate 11 and adhesive layer 18 are light transmitting and conductive layer 13 is transparent, light from light 81 will be transmitted through panel 11 to illuminate display 80. The sectional view of FIG. 20 shows this combination in assembled form. LCD display 80 includes a front polarizer 82, glass panel 83, a panel 84 of liquid crystal material, a second glass panel 85, and rear polarizer 86. These elements are joined together in the order shown when the display 80 is purchased from a manufacturer. Heater panel 10 is located behind display 80 with its layer 18 of light transmitting pressure sensitive adhesive adhered to the rear surface of rear polarizer 86 of the display. Heater panel 10 is thus firmly attached to the rear surface of LCD display 80. Any alphanumeric characters to be shown by display 80 will be visible through the transparent heater zone of panel 10, and other circuitry associated with the device will control the operation of heater panel 10 so that it turns on when a preselected low temperature is reached to insure proper operation of display 80 throughout the full temperature range to which it may be subjected. An assembly of this type is particularly useful when the LC display 80 is associated with apparatus or equipment that is located outdoors, such as a gas pump, so as to be subjected to low ambient temperatures. An alternate light source for display 80 is shown in dashed line in FIG. 20 consisting of an electroluminescent panel 88 that can be used in lieu of a fluorescent or incandescent light source. The flexible light transmitting heater panels of the invention can be used in many other types of installations in which a surface area is to be heated and visibility is to be maintained. For example, a heater panel of the present invention can be used for defogging or deicing a window panel. Another potential application is a transparent glass or plastic plate that requires heat to laminate graphic materials as this will allow the operator to view the materials through the plate when it is in position to laminate the materials. A heater can also be applied to a transparent panel of an incubator, such as a baby incubator, as it will enable the interior to be maintained at a controlled temperature and also permit viewing of the patient. Numerous other industrial applications are appropriate for incorporating the flexible heater panels of the invention.

Flexible heater panels of the invention can be made in various sizes, the size usually being limited by the capacity of the vacuum deposition equipment. For example, we have made prototype heater panels as small as 1 by 2.75 inches and as large as 11 by 18 inches. Another advantage of the heater panels of the invention is they can be made in various configurations, including rectangular, square, round, triangular, etc., and complex shapes, as may be required for a specific end use. The shape of the transparent conductive layer 13 on the flexible plastic substrate also can be in any desired configuration, and appropriate masking or etching techniques can be used to define the areas to be coated with thin film as the substrate sheet or web is processed in a vacuum deposition chamber, such as chamber 6 of the sputtering deposition process previously described.

Our invention provides light transmitting flexible heater panels incorporating a vacuum deposited transparent conductive layer that has a range of resistance due to the unique structure and composition of the conductive layers described above. The maximum power density of a heater panel, expressed as watts per square inch of conductive layer, is for rectangular conductive layers proportional to the square of the voltage applied to the panel divided by the square of the distance between the bus bar electrodes times the sheet resistance of the conductive layer, i.e. watts/square inch $\sim V^2/(d^2 XR)$. The heater panels described above have a transparent conductive layer that can have a sheet resistance in the range of about 1 to 400 ohms/square, as follows:

(1) Single lamina conductive layer of tin oxide or indium tin oxide, sheet resistance can be in the range of about 20 to 500 ohms/square.

(2) Double lamina conductive layer with first layer of indium oxide on the substrate and a second lamina of indium tin oxide over the first lamina, sheet resistance can be in the range of about 30 to 400 ohms/square.

(3) Triple laminae conductive layer with first lamina of tin oxide, indium oxide or indium tin oxide on the substrate, a second lamina of silver, platinum or palladium or an alloy of two or more said metals over the first lamina and a third lamina of tin oxide, indium oxide or indium tin oxide over the second lamina, sheet resistance can be in the range of about 1 to 100 ohms/square. The availability of a range of sheet resistance values now made possible with the new heater panels of the invention enables the selection of a panel structure with a conductive layer having a resistance tailored to the voltage supply and power density requirements of a specific end use, and the broad range of resistance values allows many different end uses to be accommodated.

An important feature of the new heater panels is their high power density capabilities. Heater panels of the present invention have a power density capability in the range of about 0 to 10 watts/square inch of conductive layer area. This is far in excess of the power density capability of transparent gold thin film transparent heater panels of the prior art, which is only in the range of 0 to 2 watts/square inch. Our new constructions thus make heater panels with high current carrying capacity available which, bearing in mind their broad range of resistance values, can broaden the range of end uses or applications of transparent flexible heater panels.

Important optical advantages are also obtained with the new heater panels in addition to their enhanced electrical characteristics described above. First, heater panels of the invention transmit a high percentage of the incident light, and the several transparent conductive layers described above transmit at least about 50% of the incident light. For example, the light transmission of the single lamina and double laminae transparent conductive layers described above is generally in the range of at least about 75% to 85%, and the light transmission of the triple laminae transparent conductive layer described above is generally in the range of about 55% to 70%. The high degree of light transmission of heater panels of the invention increases the visibility of the object to which a heater panel is attached in comparison to prior art heater panels that transmit only about 40% of incident light. Secondly, the transparent conductive layers of the invention are essentially colorless, so that the light transmitted through the heater panel is not significantly altered in color. Thus, the new heater panels do not adversely affect the light transmitted through them.

The foregoing provides a detailed description of several embodiments of flexible heater panels of the invention to present complete and enabling description to those skilled in the art, but it is expected that changes and modifications to the embodiments described above can be made by those of ordinary skill in the art that will remain within the true spirit and scope of this invention.

WE CLAIM:

1. A flexible light transmitting heater panel comprising, in combination:
   (1) a flexible light transmitting plastic film substrate;
   (2) a vacuum deposited transparent conductive layer on a first surface of the substrate selected from the group consisting of
      (i) a single lamina of tin oxide or indium tin oxide, (ii) a first lamina of indium oxide on the first surface of the substrate and a second lamina of indium tin oxide over the first lamina, or (iii) a first lamina of tin oxide, indium oxide or indium tin oxide on the first surface of the substrate, a second lamina of silver, platinum or palladium or an alloy of two or more of said metals over the first lamina, and a third lamina of tin oxide, indium oxide or indium tin oxide over the second lamina, the transparent conductive layer being in the range of about 200 to 5,000 Angstroms thick; and (3) a first conductive electrode extending over a first edge portion of the transparent conductive layer, and a second conductive electrode extending over a second edge portion of the transparent conductive layer spaced from and opposite from the first edge portion thereof, the first and second electrodes each including a section for connecting the heater panel to an AC or DC power source.

2. A flexible light transmitting heater panel comprising, in combination:

(1) a flexible light transmitting plastic film substrate;

(2) a vacuum deposited transparent conductive layer on a first surface of the substrate selected from the group consisting of (i) a single lamina of tin oxide or indium tin oxide, (ii) a first lamina of indium oxide on the first surface of the substrate and a second lamina of indium tin oxide over the first lamina, or (iii) a first lamina of tin oxide, indium oxide or indium tin oxide on the first surface of the substrate, a second lamina of silver, platinum or palladium or an alloy of two or more of said metals over the first lamina, and a third lamina of tin oxide, indium oxide or indium tin oxide over the second lamina, the transparent conductive layer being in the range of about 200 to 5,000 Angstroms thick;

(3) a first conductive electrode extending over a first edge portion of the transparent conductive layer, and a second conductive electrode extending over a second edge portion of the transparent conductive layer spaced from and opposite from the first edge portion thereof, the first and second electrodes each including a section for connecting the heater panel to an AC or DC power source; and in which (4) the transparent conductive layer covers a first portion of the first surface of the substrate, a pair of conductive traces are formed on another portion of the first surface of the substrate, and a chip thermistor is connected between the conductive traces for detecting substrate temperature when the heater panel is activated.

3. A flexible heater panel according to claim 1, wherein:

a layer of light transmitting adhesive covers the conductive layer.

4. A flexible heater panel according to claim 1, wherein:

a layer of light transmitting pressure sensitive adhesive covers the transparent conductive layer, and a release liner covers said adhesive.

5. A flexible heater panel according to claim 1, wherein:

the transparent conductive layer is rectangular in shape, and the first and second electrodes extend across opposed long edge portions of said layer.

6. A flexible heater panel according to claim 1, wherein:

the transparent conductive layer is rectangular in shape, and the first and second electrodes extend across opposed short edge portions of said layer.

7. A flexible heater panel according to claim 1, wherein:

the flexible plastic film substrate is die-cut to have a pair of spaced tails, and the connecting section of the first electrode is on one tail and the connecting section of the second electrode is on the other tail.

8. A flexible heater panel according to claim 1, wherein:

the transparent conductive layer is on a first portion of the first surface of the substrate, and the connecting sections of the first and second electrodes are on a second portion of the first surface of the substrate and separated from each other by the substrate.

9. A flexible heater panel according to claim 1, wherein:

a vacuum deposited transparent second conductive layer is on a second surface of the substrate opposite from the first surface, and a pair of spaced conductive electrodes extend over opposed edge portions of the second conductive layer.

10. A flexible heater panel according to claim 1, further including:

a light transmitting plastic top film laminated over the conductive layer with light transmitting adhesive.

11. A flexible heater panel according to claim 10, further including:

a first layer of light transmitting adhesive over the top film.

12. A flexible heater panel according to claim 11, further including:

a second layer of light transmitting adhesive along a second surface of the substrate opposite from the first surface thereof.

13. A flexible heater panel according to claim 10, further including:

a layer of light transmitting adhesive along a second surface of the substrate opposite from the first surface thereof.

14. A flexible heater panel according to any one of claims 1–13, wherein:

the conductive electrodes are defined by printed silver conductive ink.

* * * * *